United States Patent
Miyasaka

(10) Patent No.: US 6,700,250 B2
(45) Date of Patent: Mar. 2, 2004

(54) VIBRATION MOTOR

(75) Inventor: Tomoyuki Miyasaka, Nagano (JP)

(73) Assignees: Entac Co., Ltd., Nagano-ken (JP); O Planning Co., Ltd., Nagano-ken (JP)

(*) Notice: Subject to any disclaimer, the term of this patent is extended or adjusted under 35 U.S.C. 154(b) by 0 days.

(21) Appl. No.: 10/083,265

(22) Filed: Oct. 19, 2001

(65) Prior Publication Data

US 2002/0195891 A1 Dec. 26, 2002

(30) Foreign Application Priority Data

Jun. 20, 2001 (JP) .................................. 2001-185946

(51) Int. Cl.⁷ .................................................. H02K 7/06
(52) U.S. Cl. ......................... 310/81; 31/40 MM; 31/261
(58) Field of Search .................... 310/81, 82, 192, 310/193, 40 MM, 261; 318/114

(56) References Cited

U.S. PATENT DOCUMENTS

| | | | |
|---|---|---|---|
| 3,064,150 A | * 11/1962 | Barnes | 310/154.25 |
| 5,094,165 A | * 3/1992 | Sugiyama et al. | 310/269 |
| 5,327,035 A | * 7/1994 | Sunaga | 310/81 |
| 5,982,055 A | * 11/1999 | Matsushita et al. | 310/40 MM |

FOREIGN PATENT DOCUMENTS

JP         9-182366         7/1997

* cited by examiner

*Primary Examiner*—Thomas M. Dougherty
*Assistant Examiner*—Leda Pham
(74) *Attorney, Agent, or Firm*—Flynn, Thiel, Boutell & Tanis, P.C.

(57) ABSTRACT

In order to provide a vibration motor which can make a starting force strong with maintaining saving electric power and increase a vibration force, in the vibration motor, a facing gap between a central salient pole and a pair of auxiliary salient poles are shifted and arranged around a rotating shaft with non-centrosymmetry and a facing gap between the central salient pole and the field magnet is formed narrower than facing magnets between the auxiliary salient poles and the field magnet. Further, an exciting force of the central salient pole is greater than that of the auxiliary salient poles and in starting, the same magnetic pole as the magnetic pole of the field magnet generates in a facing surface of the central salient pole and a repulsive force occurs so that the armature core is urged to rotate.

14 Claims, 3 Drawing Sheets

VIBRATION MOTOR

BACKGROUND OF THE INVENTION

1. Field of the Invention

The present invention relates to a vibration motor having an armature core being shifted and arranged around a rotating shaft with non-centrosymmetry.

2. Description of the Related Art

A vibration motor is used in portable telephone terminal and a pager and others. For example, a vibration motor of this type, as shown in Japanese Patent Laid-Open No. 9-182366, is a flat type vibration motor that is disclosed that an armature core on which winding (coils) wound is shifted and arranged around a rotating shaft with non-centrosymmetry so that vibration force generates.

FIG. 6 shows a vibration motor of this type. Armature core 20 has three salient poles 21, 22, 23. Salient pole 22 is located in the center thereof and salient poles 21, 23 are spaced apart by about 85° from center salient pole 22 on either side. Coils 21a, 22a, 23a are wound on these salient poles, respectively. Rotating shaft 24 is (passed through and) fastened to a center of armature core 20. Furthermore, a flat type commutator that is not shown is arranged on one surface of armature core 20 around rotating shaft 24. In addition, cylindrical field magnet 25 faces an outer circumferential surface of armature core 20. Field magnet 25 is magnetized and divided into 6 poles.

A pair of brushes which is not shown are slidably in contact with the flat type commutator and coil 21a, 22a, 23a are energized, respectively. Thus, each of salient poles 21, 22, 23 of armature core 20 is excited. Armature core 20 rotates by means of magnetic action with field magnet 25. At this time, three salient poles 21, 22, 23 of armature core 20 are shifted and arranged. Therefore, a mass of armature core 20 is composed around rotating shaft in unbalance, the vibration motor occurs a strong vibration with a rotation of armature core 20.

As in the case of a commonly well-known motor, a vibration motor composed as above rotates (drives) by electromagnetic theory except that three salient poles 21, 22, 23 of armature core 20 are shifted and arranged. It is necessary to increase the mass of armature core 20 and the unbalance (distance of the center of gravity from the rotating shaft) in order to get a strong vibration. However, a cogging force that the mass unbalance contributed to is concentrated on because there is a little number of salient poles and those salient poles are shifted. As a result, there is the problem that the vibration motor does not start.

For the above problem, some solution can be obtained by which a lot of current is supplied to the coil and a starting force comes to be strong. On the other hand, a power consumption becomes big and as a result the new problem occurs that the vibration motor cannot be adopted a portable telephone and like that particularly in a use of being demanded a saving electric power.

SUMMARY OF THE INVENTION

The present invention, in consideration of the above problems, can make a starting force strong with maintaining saving electric power and is to provide a vibration motor which can increase a vibration force.

In order to achieve the above object, a vibrating motor according to claim 1 of the present invention is to provide a field magnet having 6 magnetic poles such that S and N magnetic poles are alternately magnetized (positioned) in a circumference direction, a rotating shaft, a armature core having three salient poles consisting of a central salient pole which are spaced apart from the central salient pole on either side, the three salient poles being shifted and arranged around the rotating shaft with non-centrosymmetry a coil being wound on each of said three salient poles; wherein; facing gap between the central salient pole and the field magnet is formed narrower than a facing gap between the auxiliary salient poles and the field magnet, an exciting force of the central salient pole is greater than that of the auxiliary salient poles; and, in starting, the same magnetic pole as the magnetic pole of the field magnet generates in a facing surface of the central salient pole and a repulsive force occurs so that the armature core is urged to rotate.

According to invention defined in claim 1, the facing gap between the central salient pole and the field magnet is formed narrower than the facing gaps between the auxiliary salient poles and the field magnet, the exciting force of the central salient pole is greater than that of the auxiliary salient poles, the repulsive force generating between the field magnet and the central salient pole is getting big (large), and, in starting, the same (magnetic pole) as the magnetic pole facing to the field magnet is generated in the central salient pole and the repulsive force occurs so that the armature core is urged to rotate. In addition, the pair of auxiliary salient poles is urged to rotate assistantly the armature core in a rotation direction by means of electromagnetic action between the auxiliary salient poles and facing field magnets and a direction of rotation in starting is getting constant.

Furthermore, the facing gap between the central salient pole and the field magnet is formed narrower than the facing gaps between the auxiliary salient poles and the field magnet. Thus, a center of gravity of the armature core which is shifted and arranged around the rotating shaft with non-centrosymmetry shifts to the central salient pole (side) so that it's unbalance and a vibration becomes further stronger. In addition, the exciting force of the central salient pole is greater than that of the auxiliary salient poles and the armature core is urged to rotate as to center a repulsive force generating between the field magnet and the central salient pole. Thus, a cogging force of the vibration motor becomes big and the vibration is more strongly generated by the magnetic action.

In addition, a vibrating motor according to claim 2 of the present invention is characterized in that the facing surface of the central salient pole which is facing to the field magnet is formed approximately arc-shaped and each facing gap length on either side of a circumferential direction of the central salient pole is different.

According to invention defined in claim 2, the facing surface of the central salient pole, which is facing to the field magnet, is formed approximately arc-shaped and each facing gap length on either side of a circumferential direction of the central salient pole is different. Thus, in the condition that the armature core stops, the field magnet and the central salient pole are stable with approximately geometric center position. The center position is different from a magnetically center. When the same magnetic pole of the field magnet is generated and excited in the facing surface of the central salient pole from this condition, a big repulsive force occurs due to a difference of the magnetically center so that a starting force becomes big.

In addition, a vibration motor according to claim 3 of the present invention is characterized in that width of rib of the central salient pole on which the coil is wounded is formed greater than that (width of rib) of the auxiliary salient poles.

According to invention defined in claim 3, the width of rib of the central salient pole is formed great, so that an effective length of the coil becomes long and an excitation power of the central salient pole is getting big. Because a center of gravity of the armature core shifts in the central salient pole side, a vibration becomes further stronger.

A vibrating motor according to claim 4 of the present invention is characterized in that a number of turns of the coil wound on the central salient pole is bigger than that (number of turns) of the coil wound on (each of) the auxiliary salient poles and exciting force becomes large.

According to invention defined in claim 4, an excitation force of the central salient pole becomes large and a big repulsive force occurs so that a starting force increases and in addition, an urging force in order that the armature core rotates increases and a big vibration is provided.

A vibration motor according to claim 5 of the present invention is characterized in that a locus circle is made by facing surfaces between the field magnet and the three salient poles which is consisted of the central salient pole and the pair of auxiliary salient poles, and the locus circle is formed in in an approximately oval and a center of the field magnet and center of the locus circle approximately correspond with the rotating shaft.

According to invention defined in claim 5, the locus circle is made by the facing surfaces between the field magnet and the three salient poles which is consisted of the central salient pole and the pair of auxiliary salient poles and the locus circle is formed in the approximately oval and the center of gravity of the armature core shifts in the central salient pole side so that a vibration in a rotation becomes further stronger.

A vibration motor according to claim 6 of the present invention is characterized in that a locus circle is made by facing surfaces between the field magnet and the three salient poles which is consisted of the central salient pole and the pair of auxiliary salient poles, the locus circle is formed smaller than inside diameter of the field magnet, a center of the field magnet is almost coincident with rotating shaft and a center of the locus circle shifts (offsets) toward the central salient pole (side) from the rotating shaft.

According to invention defined in claim 6, the center of the locus circle which is made by facing surfaces between the field magnet and the three salient poles which is consisted of the central salient pole and the pair of auxiliary salient poles is offset toward the central salient pole (side) from the rotating shaft. Thus, the center of gravity of the armature core shifts in the central salient pole (side), the vibration in a rotation becomes further stronger.

DESCRIPTION OF THE PREFERRED EMBODIMENTS

The present invention will now be described in detail with references to the drawings as follows.

Figure 1:
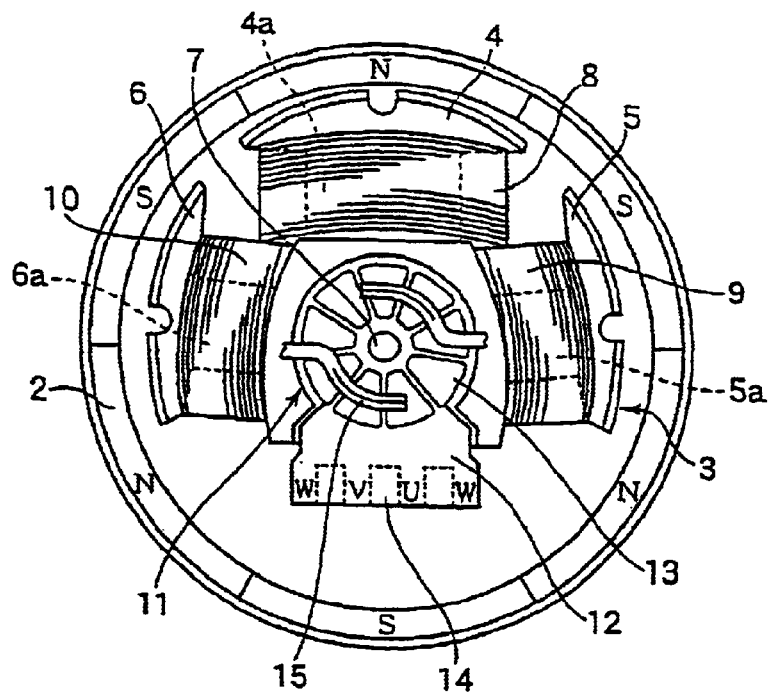
FIG. 1 is a plan view showing an embodiment of a vibration motor according to the present invention.

FIG. 1 is a plan view showing a vibration motor according to the present invention. Case 1 is formed in an approximately plate-shaped and field magnet 2 is arranged on an internal circumference surface of the case 1. N (north) pole, S (south) pole are magnetized alternately in the circumferential direction of field magnet 2. Magnetizing of field magnet 2 is made by either method of sine wave magnetizing or trapezoid magnetizing. This field magnet 2 is employed a sintered magnet or a bond magnet based on rare earth's such as ferrite or neodymium/iron/boron. It is desirable to employ a rare earth magnet in order to get bigger vibration as a vibration motor.

Armature core 3, which is fixed to rotating shaft 7, is arranged inside of the field magnet 2. Rotating shaft 7 is supported by the bearing, which is not shown, arranged in case 1. Armature core 3 has three salient poles 4, 5, 6. Salient pole 4 is located in the center of the three salient poles and a pair of auxiliary salient poles 4, 5 respectively are spaced apart from central salient pole 4 on either side. The salient poles 4, 5, 6 are arranged around rotating shaft 7 with non-centrosymmetry. For example, the armature core 3 laminates magnetic plates more than two pieces. Furthermore, the magnetic plate that is arranged in each surface is bent its facing surface which is facing to field magnet 2 in an axial direction. Thus, a width of a top and bottom direction (the axial direction) of the magnetic plates is getting wide. Therefore, a permissible dose of effective magnetic flux increases.

Figure 2:
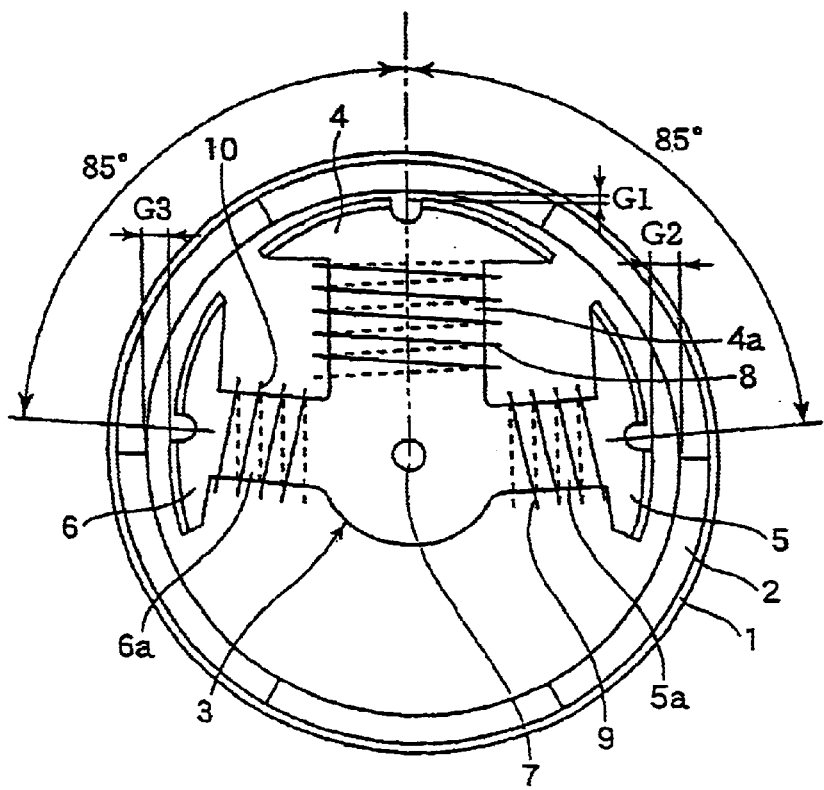
FIG. 2 is an illustration of dimensions of a vibration motor shown in FIG. 1.

The pair of auxiliary salient poles 5, 6 is arranged with open angle of approximately 85° around central salient pole 4 as shown in FIG. 2. In addition, facing gap G1 between facing surface of central salient pole 4 witch is facing to field magnet 2 becomes smaller than facing gaps G2, G3 between facing surfaces of the pair of auxiliary salient poles 5, 6 on either side of central salient pole 4.

That is, in armature core 3, the locus circle which is made between a facing surface of central salient pole 4 and facing surfaces of the pair of auxiliary salient poles 5, 6 on either side of central salient pole 4 is formed in an approximately oval and a center of field magnet 2 and a center of the locus circle roughly correspond with rotating shaft 7. As shown in FIG. 2, facing gap length G1 of central salient pole 4 is narrower than facing gaps length G2, G3 of auxiliary salient poles 5, 6. By the way, facing gaps lengths G2, G3 are set larger than 2 times of facing gap length G1. It is desirable that facing gap length G2 of auxiliary salient pole 5 and facing gap length G3 of auxiliary salient pole 6 set in approximately the same dimension.

Furthermore, width of rib 4a of central salient pole 4 in a circumferential direction is formed greater than that of rib 5a, 6a of the pair of auxiliary salient poles 5, 6 on either side of central salient pole 4. And, each coil 8, 9, 10 are wound in rib 4a of central salient pole 4 and ribs 5a, 6a of auxiliary salient poles 5, 6. Number of turns of coil 8 wound on rib 4a of central salient pole 4 becomes bigger than number of turns of coils 9, 10 wound on ribs 5a, 6a of auxiliary salient poles 5, 6.

As thus described, it can increase by magnetic flux density to pass central salient pole 4 because width of rib 4a of central salient pole 4 is formed greater than that of ribs 5a, 6a of auxiliary salient poles 5, 6. In addition, it can increase with an exciting force by increasing the number of turns of coil 8 wound on rib 4a of central salient pole 4. As a result it is described below about provided action.

In armature core 3 composed, as above, a flat type commutator 11 is located around rotating shaft 7. In commutator 11, a plurality of segments 13, which are formed by printed circuit on one surface of insulating plate 12, are arranged with alignment shaped like a circumference. For example, in this detailed description of the preferred embodiment, nine approximately trapezoid-shaped segment 13 is arranged in. Furthermore, terminal portion 14 is formed in one end of insulating plate 12 by printed circuit. Starting and end termination of coil 8, 9, 10 as described above are electrically connected to this terminal portion 14. In addition, nine segments 13 are electrically connected to terminal portion 14 by means of the printed circuit that is not shown.

A pair of brushes 15 is slidably in contact with segment 13 of commutator 11. The pair of brushes 15 are apart from each other with open angle of 180°. These brushes 15 are formed by a conductor metal plate having elasticity and the end portion turns in direction of rotation as shown in FIG. 1. In addition, these end portion branches a yoked shaped off and the yoked shaped portion is slidably in contact with in segment 13 by pressing suitable pressure. Bottom of brush 15 is fixed by the cover which is not shown. The cover covers previously described case 1. In addition, bottom of brushes 15 are connected to direct current power supply through a connector or a lead wire which is provided in case 1.

Next, a rotation of the vibration motor consisting of the above-mentioned configuration is described according to FIG. 4. FIG. 4(A) shows the condition that the vibration motor stops. It isn't energized in each coil 8, 9, 10 so that central salient pole 4 and auxiliary salient poles 5, 6 are not excited. At this time, an approximately center of central salient pole 4 wherein facing gap to field magnet 2 is the narrowest is attracted by the center of magnetic pole, for example N pole, of field magnet 2. As a result, armature cores 3 stops.

Afterward, each coil 8, 9, 10 are energized through commutator 11 to make N pole excite the facing surface of central salient pole 4. At the same time, this makes N pole excite one auxiliary salient pole 5 and makes S pole excite other auxiliary salient pole 6. The magnetic pole which is excited by central salient pole 4 are the same pole as N pole of field magnet 2 so that both rebel one another. Then, the N pole which is excited in one auxiliary salient pole 5 is attracted by S pole of vicinity of field magnet 2. Furthermore, the S pole which is excited in other auxiliary salient pole 6 is attracted by N pole of vicinity of field magnet 2 so that armature core 3 is displaced in an anti-clock direction of the allow of FIG. 4. Thus, a repulsive force between central salient pole 4 and field magnet 2 acts on so that armature core 3 begins to rotate in an anti-clock direction of the allow of FIG. 4 and then the vibration motor starts.

As described before, width of rib 4a of central salient pole 4 is formed greater than width of ribs 5a, 6a of auxiliary salient poles 5, 6. As a result, magnetic flux density to pass central salient pole 4 increases. Furthermore, because number of turns of coil 8 wound in central salient pole 4 is increased than that of coils 9, 10 wound in auxiliary salient poles 5, 6, an excitation force of center salient pole 4 increases by a large amount. Accordingly, armature core 3 is urged by an anti-clock direction by a strong repulsive force between central salient pole 4 and field magnet 2. Thus, armature core 3 can start easily.

Figure 4A:
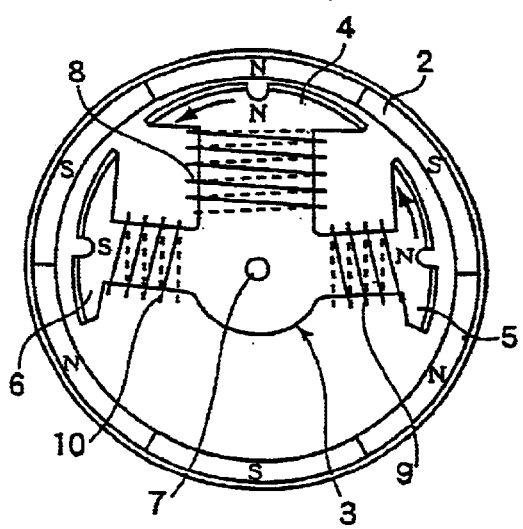
FIGS. 4(A)–(D) are illustrations of a rotation action of a vibration motor according to the present invention.
Figure 4B:
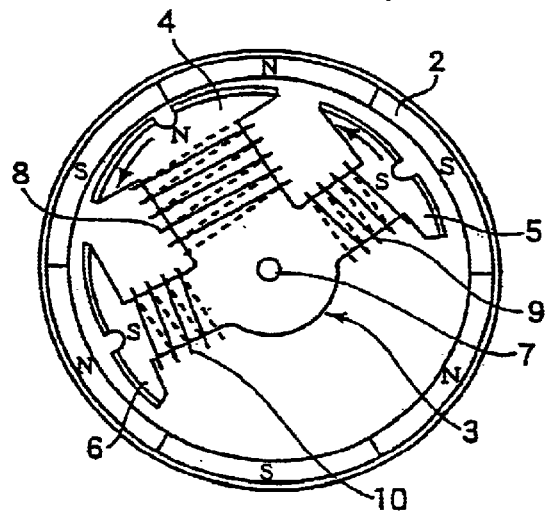

After starting, when armature core 3 rotates almost 40°, a direction of current in each coil 8, 9, 10 is switched by means of commutator 11 and armature core 3 is located a location shown in FIG. 4(B). That is, the excited magnetic pole on central salient pole 4 and the excited magnetic pole on one auxiliary salient pole 5 do not vary, however, other auxiliary salient pole 6 is excited to provide N pole. Therefore, the N pole of central salient pole 4 is attracted by S pole of field magnet 2 forward in direction of rotation so that, furthermore, armature core 3 is urged to rotate. In addition, S pole of one auxiliary salient pole 5 receives repulsion by S pole of field magnet 2 so that armature core 3 is urged to rotate. Thus, armature core 3 continues the rotation toward an anti-clock direction.

Figure 4C:
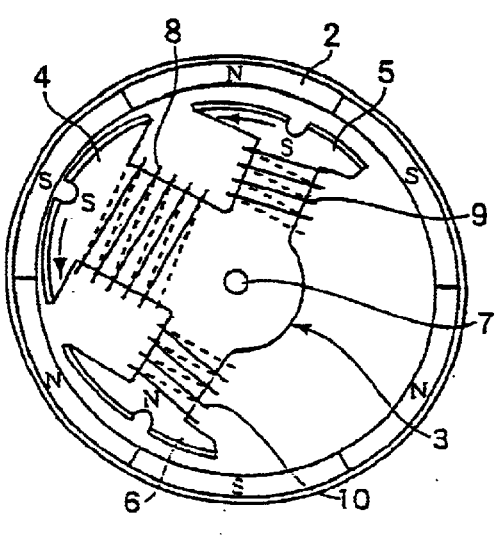
Figure 4D:
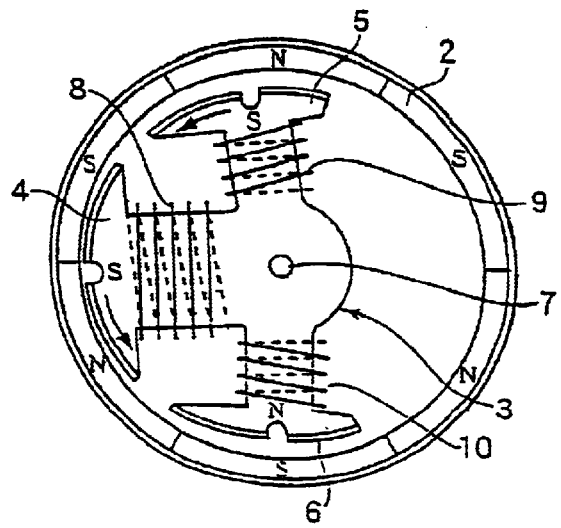

When armature core 3 rotates to location shown in FIG. 4(C), central salient pole 4 is excited to provide S pole. At the same time, one auxiliary salient pole 5 is excited to provide S pole and other auxiliary salient pole 6 is excited to provide N pole. As a result, the magnetic pole placement shown in FIG. 4(C) becomes reverse magnetic pole placement against that shown in FIG. 4(A). Therefore, an excited magnetic pole on central salient pole 4 receives a repulsive force due to the same magnetic pole, that is, S pole of field magnet 2. The excited S pole on one auxiliary salient pole 5 is attracted by N pole of field magnet 2 forward in direction of rotation. Furthermore, N pole on other auxiliary salient pole 6 is attracted by N pole of field magnet 2 forward in direction of rotation. Armature core 3 is urged to ratate in the anti-clock direction.

When armature core 3 rotates afterward to location shown in FIG. 4 (D), S pole of central salient pole 4 is attracted by N pole of field magnet 2 forward in direction of rotation. Thus, armature core 3 is urged to rotate further. N pole of one auxiliary salient pole 5 receives repulsion by N pole of field magnet 2 so that amarture core 3 is urged to rotate. Armature core 3 continues a rotation toward an anti-clock direction, furthermore. Afterward, every turning angle of 40° by configuration of nine segment 13 of commutator 11, by appropriately changing a direction of current energizing in each coil 8, 9, 10, each salient pole of armature core 3 repeats repulsion or attraction facing to the magnetic poles of field magnet 2 and amarture core 3 is urged to rotate. And, when energization to each coil 8, 9, 10 is stopped, armature core 3 stops in condition that the center of magnetism of central salient pole 4 and magnetic pole center of field magnet 2 are attracted mutually.

The vibration motor as described above, since there is a little number of poles of armature core 3, a number of revolutions from thousands revolutions per minute through one thousand revolutions per minute is provided and a big vibration is provided by the rotation. That is, three salient poles which are shifted against field magnet 2 and facing gap to central salient pole 4 is formed narrower than facing gaps to auxiliary salient poles 5, 6 so that a center of gravity of armature core 3 is made to be shifted to still more central salient pole 4 side. Accordingly, a strong vibration is provided.

In addition, an excitation force of central salient pole 4 gets bigger than that (an excitation force) of auxiliary salient poles 5, 6. Thus, armature core 3 is urged to rotate mainly by a repulsive force between field magnet 2 and central salient pole 4. Even if a current value is comparatively small, the vibration motor is provided with enough a starting force and a force urged to rotate. Accordingly, it is possible to reduce power consumption thereof. Furthermore, since the vibration motor has the configuration depending primary on central salient pole 4, cognize force becomes big. By this, a vibration occurs electromagnetically and furthermore, a strong vibration can be got.

The vibration motor according to the present invention as explained above, when starting from a condition of stability that central salient pole 4 of armature core 3 and field magnet 2 attracted magnetically one another, a magnetic repulsive force between central salient pole 4 and field magnet 2 is principally used. Attraction force to magnetic pole of field magnet 2 of auxiliary salient pole 5, 6 is taken advantage of in auxiliary and it makes direction of rotation of armature core 3 set and urged to rotate. As thus described, when starting from a condition of stability that the geometric center of central salient pole 4 and the magnetic center of field magnet 2 correspond, both are in the balance so that the repulsive force to be urged to rotate becomes weak. Thus, there is the case that starting torque becomes not enough.

Figure 3:
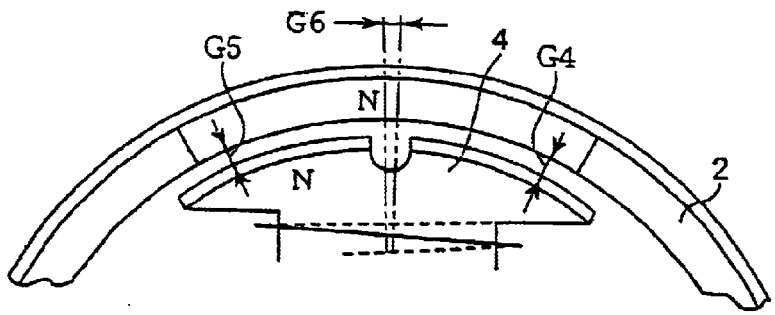
FIG. 3 is a plan view which shows an alternative of a central salient pole shown in a vibration motor according to the present invention.

Now, in order to more increase the starting torque, the vibration motor of the present invention makes facing gap length of a facing surface of central salient pole 4 to be facing to field magnet 2 be different on either side in a circumferential direction of central salient pole 4. That is, as shown in FIG. 3, the facing surface of central salient pole 4 which is facing to field magnet 2 is not concentric circle from a center of the rotating shaft. That is, facing gap length G5 of left edge side becomes narrower than facing gap length G4 of right edge side of FIG. 3. Difference of these facing gap length G4, G5 are desirable around 0.1 mm when having done dimension with 14 mm from center of central salient pole 4. Generally, the difference of facing gaps length as opposed to dimension is set in 0.5% from 1.5% from a center of central salient pole.

As thus described, with the condition that armature core 3 stopped, central salient pole 4 is almost stable with a geometric center location (as shown in central line C1) against magnetic pole of field magnet 2. Note that, when difference of described above facing gap length is increased, the vibration motor becomes to attract the short facing gap length side of central salient pole 4 toward a magnetic pole center of field magnet 2. It is unfavorable because repulsive force becomes small.

From this condition, when the same magnetic pole as facing magnetic pole to field magnet 2 is generated and excited in (the facing surface of) central salient pole 4, the magnetic flux that is generated from central salient pole 4 occurs to focus on narrow facing gap length G5 and a difference G6 between magnetically center position of field magnet 2 and it occur. A big repulsive force between central salient pole 4 and field magnet 2 occurs due to the difference G6 so that a starting force becomes big.

Figure 5:
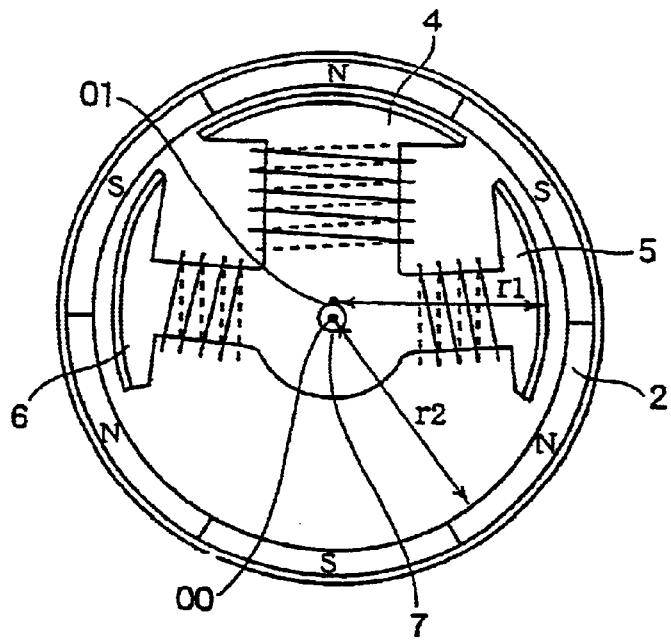
FIG. 5 is a plan view showing another embodiment of a vibration motor according to the present invention.
Figure 6:
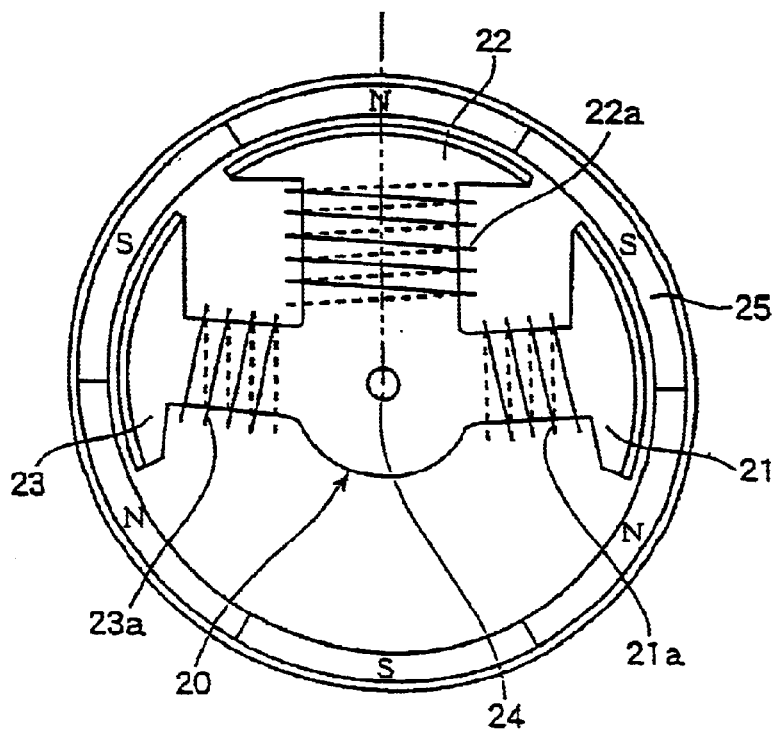
FIG. 6 is a plan view of a conventional vibration motor.

FIG. 5 shows an other embodiment that a facing gap between a field magnet and an auxiliary salient pole is wider than a facing gap between the field magnet and a central salient pole. That is, a virtual locus circle which is made by the facing surfaces between the field magnet and the three salient poles which is consisted of the central salient pole 4 and the pair of auxiliary salient poles 5, 6 on either side from central salient pole 4, the virtual locus circle of radius r1 is formed nearly a real circle. In addition, the virtual locus circle of radius r1 is formed smaller than the radius r2 of the inside surface of field magnet 2. Furthermore, a center O1 of the virtual locus circle shifts toward salient pole 4 (side) from the center than a center O0 of rotating shaft 7. In the this time, a center of field magnet 2 almost corresponds with the center O0 of rotating shaft 7.

As a result central salient pole 4 gets closer to field magnet 2 so that facing gap becomes small. The facing gap between auxiliary salient poles 5, 6 and field magnet 2 becomes a little small but it keeps still a wide condition. That is, it can be made wider than a facing gap between center salient pole 4 and field magnet 2. In this way, since the mass of armature core 3 is comprised with unbalance around the center of the rotating shaft due to three shifted salient poles, the vibration motor can produce a strong vibration as armature core 3 rotates.

It will be understood that various changes and modifications may be made in the above descried embodiments which provide the characteristics of the present invention without departing from the sprit and principle thereof particularly as defined in the following claims. The vibration motor as described above is described as a flat type in particular, but is not limited to the flat type. It may be applied to a circular cylinder type. In addition, even if the above-described commutator is not a flat type, it may be a cylindrical commutator.

As mentioned above, the vibration motor according to the present invention, since the facing gap between the central salient pole and the field magnet is formed narrower than the facing gap between the auxiliary salient poles (and the field magnet) and, in starting, the central salient pole is generated the same as the magnetic pole of the field magnet, a big exciting force and a big repulsive force occur in the central salient pole so that the amateur core can be strongly urged to rotate. In addition, a power consumption can be controlled to a minimum, too. Furthermore, the facing gap of the central salient pole is formed narrower than that of the auxiliary salient pole. Thus, the center of gravity of the armature core is shifting so that it can make the vibration of the vibration motor strong. In addition, the armature core is urged to rotate by means of a repulsive force generating between the field magnet and the central salient pole. Accordingly, the vibration occurs by the magnetic action so that it can make more strongly vibration.

What is claimed is:

1. A vibrating motor comprising:
   a field magnet having a plurality of magnetic poles such that S and N magnetic poles are alternately magnetized in a circumferential direction;
   a rotating shaft;
   an armature core having three salient poles comprising a central salient pole and a pair of auxiliary salient poles which are spaced apart from said central salient pole on either side, said three salient poles being shifted and arranged around said rotating shaft with non-centrosymmetry a coil being wound on each of said three salient poles;
   wherein;
   a facing gap between said central salient pole and said field magnet is formed narrower than facing gaps between said auxiliary salient poles and said field magnet;
   an exciting force of said central salient pole is greater than that of said auxiliary salient poles; and
   in starting, the same magnetic pole as the magnetic pole of said field magnet generates in a facing surface of said central salient pole and a repulsive force occurs so that said armature core is urged to rotate.

2. The vibration motor according to claim 1, wherein said facing surface of said central salient pole which is facing toward said field magnet is formed approximately arc-shaped; and
   each facing gap length on either side in a circumferential direction of said central salient pole is different.

3. The vibration motor according to claim 1, wherein width of a central rib of said central salient pole is formed greater than width of ribs of said auxiliary salient poles, said coil of said central salient pole being wound on said central rib.

4. The vibration motor according to claim 1, wherein a number of turns of said coil which is wound on said central salient pole is greater than the number of turns of each said coil wound on respective ones of said auxiliary salient poles to increase an exciting force.

5. The vibration motor according to claim 1, wherein a locus circle which is defined by facing surfaces between said field magnet and said three salient poles is formed in an approximately oval; and a center of said field magnet and a center of said locus circle approximately correspond with said rotating shaft.

6. The vibration motor according to claim 1, wherein a locus circle which is defined by facing surfaces between said field magnet and said three salient poles is formed having a radius smaller than an inside radius of said field magnet, a center of said field magnet almost corresponds with said rotating shaft; and a center of the locus circle shifts toward said central salient pole from said rotating shaft.

7. A vibration motor comprising:

a field magnet having magnetic poles such that S and N magnetic poles are alternately magnetized in a circumferential direction;

a rotating shaft;

an armature core received in said field magnet and secured to said rotating shaft, said armature core having a central salient pole and a pair of auxiliary salient poles which are spaced apart equidistantly from said central salient poles each said salient pole including a coil wound thereabout, each said pole having an outward end defined by a facing surface, a facing gap between the facing surface of said central salient pole and said field magnet being less than facing gaps between the facing surfaces at the ends of each of said auxiliary poles and said field magnet;

a commutator in said armature core and located around said rotating shaft, said commutator including segments; and brushes for slideable electrical contact with said segments of said commutator.

8. The vibration motor according to claim 7, wherein mass of said armature core is unbalanced with respect to the center of said rotating shaft to increase vibration as said armature core rotates.

9. The vibration motor according to claim 7, wherein in starting, magnetic flux density for said central salient pole is greater than that of each of said auxiliary salient poles and the magnetic pole of the central salient pole is the same as the adjacent magnetic pole of said field magnet to provide a repulsive force urging said armature core to rotate, and the polarity of said salient poles is switched to continue rotation of said armature core.

10. The vibration motor according to claim 7, wherein the facing surfaces at ends of said salient poles have an arc-shape defined as an oval.

11. The vibration motor according to claim 10, wherein gap lengths between said central salient pole and said field magnet differ at spaced locations on the facing surface of said central salient pole.

12. The vibration motor according to claim 7, wherein each said salient pole includes an indentation at a central location at the facing surface thereof.

13. The vibration motor according to claim 7, wherein each said salient pole includes a rib extending from a center of said armature core to the respective end defining a facing surface, said rib of said central salient pole having a greater width than a width of the ribs of said auxiliary salient poles.

14. The vibration motor according to claim 13, wherein said coil wound about said central salient pole includes more turns than each said respective coil wound about a respective one of said auxiliary salient poles.

* * * * *